(12) United States Patent
Akagi et al.

(10) Patent No.: US 6,987,635 B2
(45) Date of Patent: Jan. 17, 2006

(54) MAGNETIC DISK DRIVE WHICH ACCESSES HOST RAM

(75) Inventors: Kyo Akagi, Fuchu (JP); Kouki Uefune, Odawara (JP); Naoki Satoh, Odawara (JP); Terumi Takashi, Chigasaki (JP); Atsushi Saito, Chigasaki (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 205 days.

(21) Appl. No.: 10/383,056

(22) Filed: Mar. 7, 2003

(65) Prior Publication Data

US 2004/0017630 A1    Jan. 29, 2004

(30) Foreign Application Priority Data

Jul. 25, 2002    (JP)    .............................. 2002-216349

(51) Int. Cl.
*G11B 15/18*    (2006.01)

(52) U.S. Cl. ....................................... 360/69
(58) Field of Classification Search .................. 360/69; 711/113

See application file for complete search history.

(56) References Cited

U.S. PATENT DOCUMENTS 5,822,288 A    10/1998   Shinada

2003/0172317 A1 *  9/2003  Tsunoda et al.

FOREIGN PATENT DOCUMENTS

| JP | A-7-153182 | 6/1995 |
| JP | A-11-110917 | 4/1999 |
| JP | A-11-259979 | 9/1999 |

OTHER PUBLICATIONS

US 5,455,812, 10/1995, Shinada (withdrawn)

* cited by examiner

*Primary Examiner*—David Hudspeth
*Assistant Examiner*—Mitchell Slavitt
(74) *Attorney, Agent, or Firm*—Antonelli, Terry, Stout and Kraus, LLP.

(57) ABSTRACT

In a magnetic disk apparatus which is removably mounted or embedded to a host apparatus and intermittently accessed for recording/reproducing data, a RAM contained in the host apparatus is utilized for a portion or entirety of a buffer RAM for use in the intermittent access to accomplish a reduction in size and cost of the magnetic disk apparatus. In addition, the magnetic disk apparatus is controlled to rotate a magnetic disk at a variable rotational speed, and operated at a rotational speed at which the total power consumption is minimized in accordance with the capacity of the utilized buffer RAM and whether an access is made for recording or reproduction, thereby improving a power saving effect.

4 Claims, 6 Drawing Sheets

CHANGE IN POWER CONSUMPTION ASSOCIATED WITH INTERMITTENT ACCESS

FIG. 4

POWER CONSUMPTION DURING RECORDING OPERATION

FIG. 8

MAGNETIC DISK DRIVE WHICH ACCESSES HOST RAM

BACKGROUND OF THE INVENTION

The present invention relates to a magnetic disk apparatus and a storage system which is mounted with the same, and more particularly, to a magnetic disk apparatus suitable for mobile applications such as a portable information terminal, and a storage system which is mounted with the magnetic disk apparatus.

Conventionally, cameras, tape recorders, projectors, video recorders, and voice recorders have been used for aiding persons in memorization, while personal computers (PC), portable digital assistants (PDA) and the like have been used as a system for recording and reproducing a variety of documents such as pictures, movies and voices. These devices can record what a user has viewed and heard on a recording medium and reproduce it as required to restore the originally acquired information as it is. These devices generally start recording in response to a manipulation deliberately made by the user for "recording." In many cases, magnetic tapes and semiconductor memories are used as recording media.

For aiding persons in memorization, it is also important to precisely reproduce information whenever it is required, and in this sense, the object cannot be achieved by a tape medium which cannot be randomly accessed or a semiconductor memory which does not provide a sufficient storage capacity. A magnetic disk apparatus is most suitable as a recording medium which meets these requirements, so that it is anticipated that magnetic disk apparatus will be mounted in such recording apparatus and portable information terminals for mobile applications in the future for use in aiding persons in memorization.

In these applications, a magnetic disk apparatus is preferably mounted removably to a storage system such that information collected in the magnetic disk apparatus can be directly processed and/or utilized by a personal computer or the like, an appropriate magnetic disk apparatus can be selectively utilized to demonstrate the performance suitable for the object and cost of a particular application, or a failed magnetic disk apparatus can be readily replaced with a normal one.

A reduction in power consumption is a significant challenge for mounting a magnetic disk apparatus to a mobile device. For addressing this challenge, JP-A-11-259979, JP-A-7-153182, JP-A-11-110917, U.S. Pat. Nos. 5,455,812 and 5,822,288, and the like disclose techniques for limiting the power consumption, taking advantage of a feature of the magnetic disk apparatus which lies in that a data transfer rate between a head and a disk medium of the magnetic disk apparatus is slightly or largely higher than a data transfer rate in an interface between the magnetic disk apparatus and an external device. Specifically, a semiconductor RAM (hereinafter called the "buffer RAM") is interposed in an information input/output path to the magnetic disk such that information is intermittently transferred between the disk apparatus and buffer RAM, and a spindle motor is stopped and a signal processing circuit is powered off in the disk apparatus when no information is being transferred between the disk apparatus and buffer RAM, thereby saving the power consumption.

An optical disk apparatus, a magnetic disk apparatus or the like incorporates signal processing circuits for compression of information which is written into a magnetic medium, for signal processing such as decompression of read information, for controlling rotations of a spindle motor and movements of heads, and the like. In the aforementioned prior art, the disk apparatus incorporates, in addition to these processing circuits, a buffer RAM interposed in the information input/output path, and processing circuits for controlling intermittent accesses using the buffer RAM, stopping and starting the spindle motor associated with the intermittent accesses, powering the signal processing circuits on and off, and the like.

On the other hand, taking into account the effect of power saving, a buffer RAM having a larger capacity often tends to increase a time in which the magnetic disk is not read or written, i.e., increases the proportion of time in which the spindle motor and the like are stopped, resulting in a larger power saving effect. However, this is true only when a disk apparatus requires sufficiently small standby power consumption during a standby state, in which the spindle motor and the like are stopped, as compared with the power consumed for starting the spindle motor and the power consumed for recording and reproducing information. In a small-sized magnetic disk apparatus for a portable device, less power is consumed for start-up and recording/reproducing operations with a reduction in the size of the apparatus, resulting from a reduction in a disk mass and a windage loss during rotations, a reduction in a spindle motor shaft loss, and the like, so that an increased capacity of the buffer RAM can merely take a minor power saving effect.

As such, when a buffer RAM having a large capacity is required for achieving a large power saving effect, a RAM having such a large capacity should be mounted in each removable magnetic disk apparatus. However, this causes an increased cost of the magnetic disk apparatus. Even when a sufficient power saving effect cannot be achieved by simply increasing the capacity of the buffer RAM, the power saving is desired in any way particularly for a small-sized magnetic disk apparatus.

BRIEF SUMMARY OF THE INVENTION

It is an object of the present invention to provide a removable magnetic disk apparatus which employs a buffer RAM to intermittently read and write a magnetic disk for more securely achieving larger power saving with a lowest possible cost for the buffer RAM.

It is another object of the present invention to provide a storage system which is mounted with the magnetic disk apparatus for saving the power consumption.

The present invention discloses a magnetic disk apparatus removably mounted to a host apparatus having a RAM. The magnetic disk apparatus includes a magnetic disk, and a control mechanism for intermittently accessing the magnetic disk for recording or reproduction using a buffer RAM. The control mechanism has a function of accessing the removable or embedded RAM provided in the host apparatus for performing the intermittent access associated with recording or reproduction using the buffer RAM which is partially or entirely implemented by the RAM provided in the host apparatus.

The magnetic disk apparatus further includes rotational speed determining means for determining a rotational speed of the magnetic disk at which total power consumption of the magnetic disk apparatus reduced in accordance with at least one of the capacity of the buffer RAM utilized by the control mechanism and an access mode indicating whether or not the magnetic disk is accessed for recording or reproduction, driving control means for controlling the magnetic disk to rotate at the rotational speed determined by the rotational speed determining means, and servo clock extracting means for extracting a servo clock in accordance with the rotational speed at which the magnetic disk is driven by the driving control means.

The present invention also discloses a storage system which is comprised of the magnetic disk apparatus described above, and a host apparatus including an interface for removably mounting the magnetic disk apparatus thereto.

Other objects, features and advantages of the invention will become apparent from the following description of the embodiments of the invention taken in conjunction with the accompanying drawings.

DETAILED DESCRIPTION OF THE INVENTION

Figure 2:
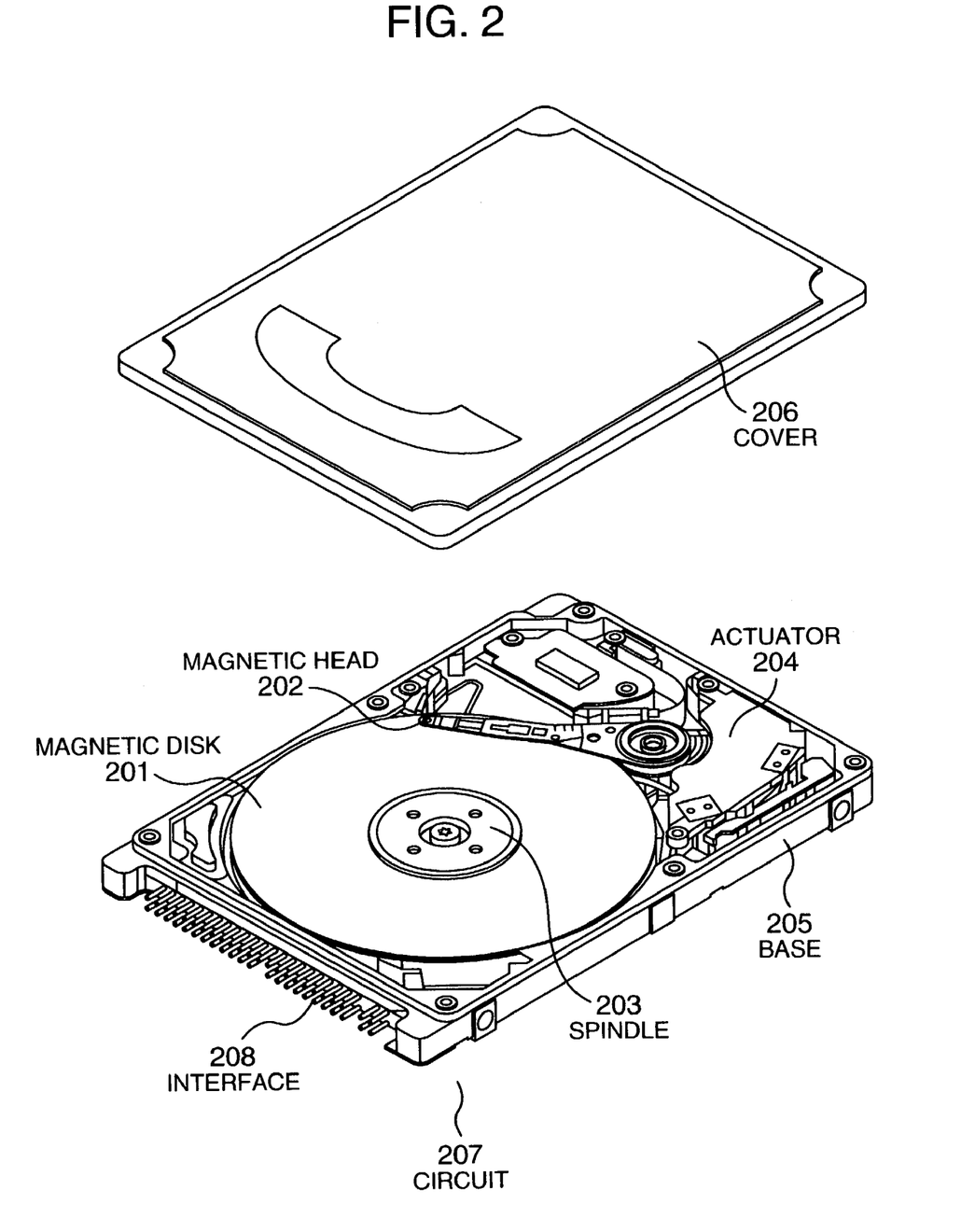
FIG. 2 is a perspective view of a magnetic disk apparatus.

In the following, one embodiment of the present invention will be described in detail. FIG. 2 illustrates the hardware configuration of a magnetic disk apparatus in a perspective view. This magnetic disk apparatus is structured for incorporation into or removable mounting to a storage system according to the present invention. The magnetic disk apparatus comprises a magnetic disk 201; a magnetic head 202 having integrated recording/reproducing heads; a spindle 203 for fixing and rotating the magnetic disk 201; an actuator 204 for radially moving the magnetic head 202 on the magnetic disk 201; a base 205 for mounting these components thereon; a cover 206; a circuit 207 for recording/reproducing information, moving the head through the actuator 204, rotating a spindle motor, inputting/outputting data from/to the outside, and the like; and an interface 208 which serves as an input/output port of data to the outside. The magnetic disk 201 preferably has a diameter of 2.5 inches or less, and more preferably 1.0 inch or less.

Figure 1:
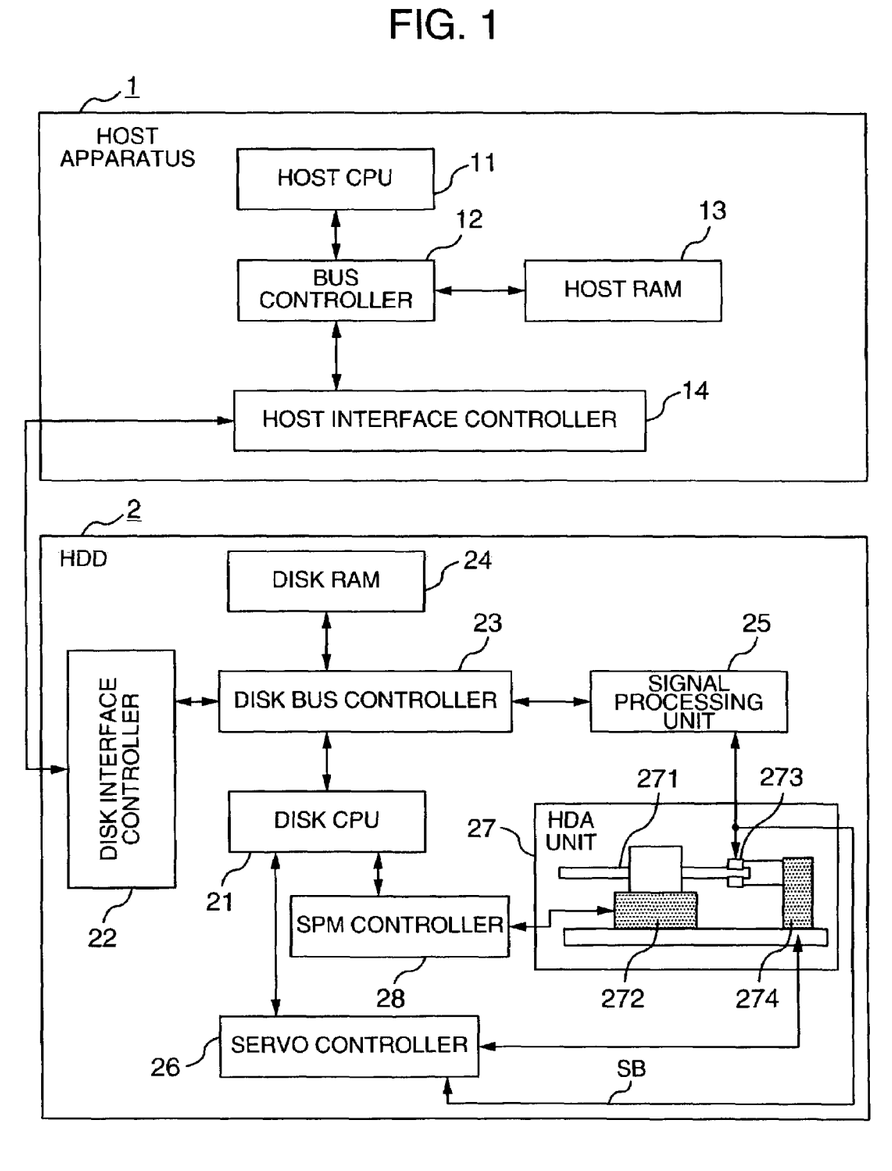
FIG. 1 is a block diagram illustrating an exemplary configuration of a storage system according to the present invention.

FIG. 1 is a block diagram illustrating an exemplary configuration of the storage system according to the present invention which is comprised of a host apparatus 1 and a magnetic disk apparatus 2. The host apparatus 1 comprises a host CPU 11; a bus controller 12; a host RAM 13; and a host interface controller 14. The host apparatus 1 may comprise additional components, for example, a graphics controller for controlling displays, a network controller for communicating information with other information processing devices, and the like, and an associated input/output device for reading and recording such information. The host CPU 11 executes instructions in accordance with a program previously installed therein. Generally, information stored on a magnetic disk is compressed, for example, in accordance with MPEG, JPEG or the like if such information is movie or picture, so that the information is decompressed, reverse to the compression, when it is read from the magnetic disk. The compression/decompression of information is responsible for the host CPU 11. The bus controller 12 controls a data transfer among the host CPU 11, host RAM 13, ROM (not shown), and host interface controller 14. The host controller 14 controls a data transfer between a disk interface controller 22 associated with the magnetic disk apparatus 2 and the host RAM 13.

The magnetic disk apparatus 2 in turn comprises a disk CPU 21; the disk interface controller 22; a disk bus controller 23; a disk RAM 24; a signal processing unit 25; a servo controller 26; an HDA unit 27; and an SPM controller 28. The disk CPU 21 generally controls data processing in the magnetic disk apparatus 2. The disk bus controller 23 controls a data transfer among the disk interface controller 22, disk RAM 24; signal processing unit 25 and disk CPU 21. Signal processing unit 25 is responsible for processing such as encoding/decoding for error detection and correction. The disk RAM 24 operates as a buffer RAM for intermittently accessing to a magnetic disk. It should be noted that a work RAM and the like for the disk CPU 21 are omitted in the figure. The HDA unit 27 comprises a magnetic disk 271 for storing data; a spindle motor 272 for driving the magnetic disk 271 for rotation; a magnetic head 273 for recording/reproduction; an actuator 274 for supporting the magnetic head 273; and the like. The servo controller 26 demodulates a servo signal SB read from the magnetic head 273, and controls the positioning of the actuator 274 using demodulated servo information. The SPM controller 28 controls the rotation of the spindle motor 272.

Next, description will be made on an intermittent access to the magnetic disk, making use of the buffer RAM, in the configuration of FIG. 1. Assuming now that the host apparatus 1 compresses an audio signal (streaming data) in accordance with the MPEG4 scheme for recording on the magnetic disk, this signal is comprised of streaming data at 64 kbits/sec at most. On the other hand, when a magnetic disk apparatus of 1-inch diameter has a surface recording density of 133 Gbits/inch$^2$, a line recording density is 1,050 kbits/inch, and a head-to-disk transfer rate on the outermost periphery of the disk is approximately 145 Mbits/sec when the disk is rotating at 3,600 rpm. In this event, therefore, data can be written into the magnetic disk at a rate approximately 2,000 times higher than the compression rate determined by MPEG4.

Figure 3:
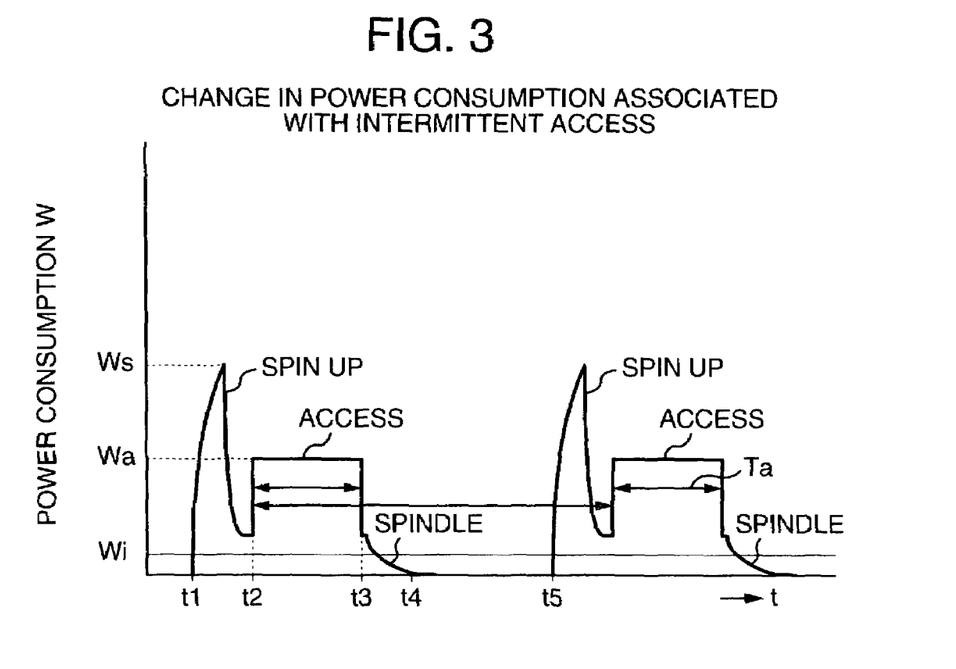
FIG. 3 is a diagram for use in describing an intermittent access to a magnetic disk.

FIG. 3 schematically illustrates an intermittent access to the magnetic disk apparatus (for recording and/or reproducing), taking advantage of the foregoing feature. The spindle is started at time t1, the magnetic disk is accessed between times t2 and t3, and then the spindle is stopped at time t4. While such operations are repeated, standby power Wi consumed when the magnetic disk is not accessed, depends on how the magnetic disk apparatus stands by. Specifically, the standby power consumption Wi depends on whether circuit systems and spindle are fully turned off except for the interface, disk RAM and disk bus controller in the magnetic disk apparatus during standby, or whether the circuit systems are only powered on without rotating the spindle, or the like. Upon starting the spindle, starting power Ws is consumed when the spindle is driven from a start to a predetermined rotational speed. Also, during an access, recording/reproducing power Wa is consumed for rotating the spindle at a constant speed and by associated processing circuits and the like. The starting power consumption Ws and recording/reproducing power consumption Wa are an increase from the standby power consumption Wi during standby, so that total power consumption W is the sum of Ws+Wi upon start-up and Wa+Wi during recording/reproducing operations. With the aforementioned streaming data, an access time (t3–t2) can be reduced to approximately ½,000 within the period of the intermittent access (t5–t1), thus permitting significant power saving. In addition, the access period can be made longer as the buffer RAM has a larger capacity.

Figure 4:
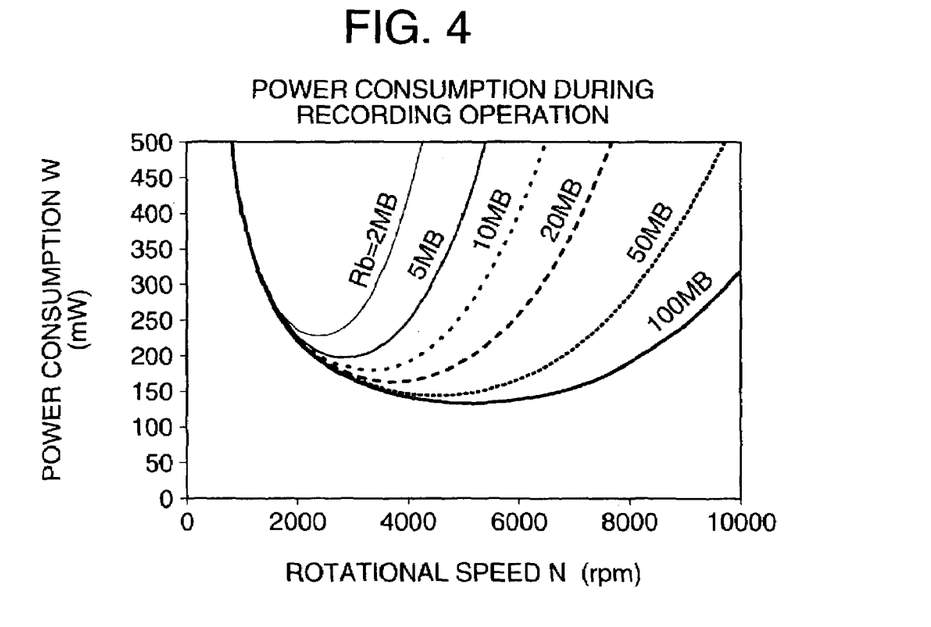
FIG. 4 shows an exemplary power consumption characteristic when information is intermittently recorded on the magnetic disk.
Figure 5:
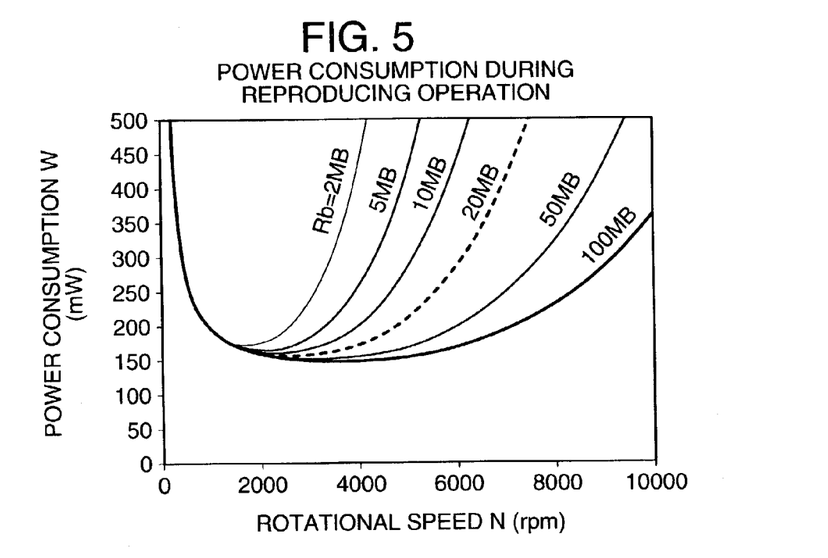
FIG. 5 an exemplary power consumption characteristic when information is intermittently reproduced from the magnetic disk.

FIGS. 4 and 5 show the total power consumption W of the magnetic disk apparatus, derived through a simulation, when changing the rotational speed N of the spindle and the capacity Rb of the buffer RAM. The magnetic disk apparatus used in the simulation is a small portable model, both in FIGS. 4 and 5, which meets the following conditions: a surface recording density is 133 Gbits/inch$^2$, a line recording density is 1,050 kbits/inch, an outer peripheral data zone of the disk has a radius of 11 mm, the conversion rate is 20 Mbits/sec in the video compression format MPEG2, and the standby power Wi shown in FIG. 3 is 0.05 W. The spindle starting power Ws is 0.8 W for a recording operation in FIG. 4 and 0.7 W for a reproducing operation in FIG. 5.

It can be seen from FIGS. 4 and 5 that in the magnetic disk apparatus of the model used in the simulation, the total power consumption W is reduced more as the buffer RAM has a larger capacity Rb when the rotational speed N is constant, whereas the capacity Rb beyond a certain level results in a smaller effect of saving the total power consumption. On the other hand, it can be understood that when the buffer capacity Rb is fixed, the total power consumption W is minimized at a certain rotational speed, and that the total power consumption W rapidly increases in response to a shift of the rotational speed N from that value at which the total power consumption W is minimized, particularly when the capacity Rb is small, for example, 10 MB. Also, as appreciated from a comparison of FIG. 4 with FIG. 5, the total power consumption W is minimized at different rotational speeds when data is recorded and when data is reproduced.

The present invention thus utilizes an empty space in the host RAM 13 as well as the disk RAM 24 in FIG. 1 as the buffer RAM for use with the intermittent access. Alternatively, though different in configuration from FIG. 1, the buffer RAM for the intermittent access may be provided in part or in entirety in the host apparatus exclusively for use as a buffer, or a free capacity of the host RAM used in the host apparatus may be used as the entire buffer RAM. In this way, the magnetic disk apparatus is reduced in size and cost as much as possible. In addition, the magnetic disk apparatus is provided with a control mechanism for varying the rotational speed of the spindle in accordance with a recording or a reproducing operation mode or in accordance with an available capacity left in the buffer RAM, thereby reducing the total power consumption W as much as possible. As appreciated, for utilizing the dedicated RAM located on the host side, the disk CPU 21, which is responsible for controlling the intermittent access to the magnetic disk, should be able to access to the RAM on the host side. In addition, associated with the control mechanism provided for varying the rotational speed of the spindle, a servo demodulation system is also required for corresponding to a change, resulting from the varying rotational speed, in a clock rate for servo information and the like read from the disk.

First, for permitting the double use of the disk RAM 24 in the magnetic disk apparatus and the RAM in the host apparatus as the buffer RAM, address mapping is conducted for corresponding an address space for the buffer RAM of the disk CPU 21 for controlling the intermittent access utilizing the buffer RAM to the disk RAM 24 and a real space of the host RAM 13 used as the buffer RAM. Here, while an access to the host RAM 13 is associated with a data transfer through the disk interface controller 22 and host interface controller 14, such a control can be readily implemented by a conventional technique. A data transfer rate between the host apparatus and magnetic disk apparatus depends on the type of the interface used therein. For example, ATA6 or later intended for mobile applications, serial ATA and the like provide a data transfer rate of 100 MB/sec or higher, which is significantly higher than the rate of compressed streaming data and comparable to the rate at which data is recorded on or reproduced from the magnetic disk, so that no grave bottleneck will not be formed between the host apparatus and magnetic disk apparatus. Also, the streaming data continuously flows between the host apparatus and the outside. In other words, data (compressed data) is continuously written into the buffer RAM during a recording operation to the magnetic disk apparatus, while data (compressed data) is also continuously read from the buffer RAM during a reproducing operation from the magnetic disk apparatus. On the other hand, data is intermittently transferred between the buffer RAM and magnetic disk, and whenever data is being transferred in either recording or reproduction, the buffer RAM must be read and written simultaneously. To accommodate this operation, a read pointer and a write pointer, for example, may be provided for managing the buffer RAM in the shape of ring, wherein data may be intermittently read from the buffer RAM such that the read pointer will not catch up the write pointer when a fast read operation and a slow write operation are performed (during recording), and data may be intermittently written into the buffer RAM such that the write pointer will not catch up the read pointer in the reverse case (during reproduction). Such techniques are also known in the art.

When the rotational speed of the spindle and hence the rotational speed of the disk are variable, the clock rate of read servo information also varies. Since the servo information is read from or written into the magnetic disk at this clock rate, the clock must be extracted following the variations in the rotational speed. A servo pattern recorded on the magnetic disk includes a clock pattern for acquiring the clock recorded together with a marker, (track) position information, and the like. Since the clock frequency at which the clock pattern is read is proportional to the rotational speed of the magnetic disk, the clock pattern need not be changed even if the rotational speed is varied, as is the case with other information in the servo pattern. Therefore, it is only required that a phase locked loop (PLL) for extracting clock information from the read servo pattern can be synchronized to the read servo pattern. For establishing this synchronization, P PLLs may be provided for use in response to the switching of the rotational speed N when it can be switched to any of P options N1, N2, . . . , NP. Alternatively, a multiplier/divider circuit may be provided at a reference input of the PLL, or at an input or output of a VCO, such that a multiplication/division ratio is switched in accordance with the rotational speed, i.e., in accordance with the clock frequency to support the synchronization. Such a PLL feature and servo demodulator circuit may be included in the servo controller 26, such that the servo demodulator circuit fetches position information using the clock extracted in the foregoing manner, thus enabling a servo control for moving the magnetic head to a track position.

Figure 6:
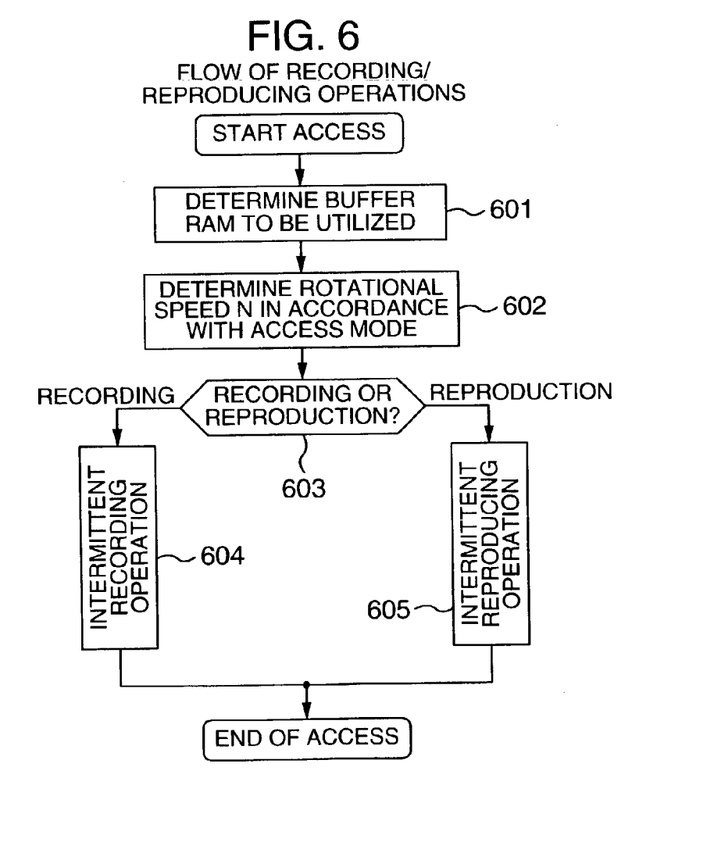
FIG. 6 is a flow chart illustrating a general flow of recording/reproducing operations in the magnetic disk apparatus according to the present invention.

Next, description will be made on recording/reproducing operations associated with the aforementioned storage system according to the present invention. FIG. 6 is a flow chart illustrating the general flow of the recording/reproducing operations, which is executed by the disk CPU 21 in the magnetic disk apparatus. First, upon start of an access to the magnetic disk, the disk CPU 21 determines a RAM which is to be utilized as the buffer RAM for an intermittent access (step 601). Assume herein that the disk RAM 24 has a capacity $Rb_1$ (in MB), and the capacity of the RAM available in the host apparatus is $Rb_2$ (in MB). The host apparatus may be provided with an extra RAM for intermittent access separately from the host RAM 13, in which case $Rb_2$ is constant. When a portion of the host RAM 13 is utilized for an intermittent access, its capacity may be varied from one access to another or may be determined at a fixed value. In any case, while it is generally preferable that a largest possible capacity is ensured within an available range, the capacity should not be increased beyond a predetermined limit if no significant effect of saving the power consumption is expected by an excessive increase in the capacity. The determination on the capacity is assumed to be made in accordance with a method previously defined in accordance with the characteristics of the magnetic disk apparatus. Upon determination of addresses in the RAM utilized for the intermittent access in the host apparatus, an address space for the disk CPU 21 can be mapped to the addresses of the RAM in the host apparatus, so that the disk CPU 21 can access the buffer RAM, which extends over the magnetic disk apparatus and host apparatus, regarded as a single memory space. The capacity Rb amounts to $(Rb_1+Rb_2)$ MB.

Subsequent to the determination of the buffer RAM, the disk CPU 21 determines a preferred rotational speed N for the spindle in accordance with the capacity Rb of the buffer RAM and an access mode, i.e., whether the access is made for recording or reproduction (step 602). For this determination, the power consumption characteristic of the magnetic disk apparatus as illustrated in FIGS. 4 and 5 may have been previously found through a simulation or a measurement to determine the rotational speed N, at which the total power consumption W can be maximally reduced, for the capacity Rb of each available buffer RAM. Thus, the rotational speeds which provide the minimum total power consumption W are found from among available rotational speeds for tabulation of these rotational speeds in correspondence to the respective capacities Rb of available buffer RAMs. While the foregoing description has been made on assumption that the rotational speed N is variable, it is also possible that the buffer RAM is removably mounted to a host and the rotational speed N is fixed, then capacity of the buffer RAM can be chosen, at which the total power consumption W can be maximally reduced. In this case, Step 602 can be skipped.

Upon determination of the buffer RAM and rotational speed, the disk CPU 21 determines whether the current access is for recording or reproduction (step 603), and performs an intermittent recording operation (step 604) or an intermittent reproducing operation (step 605), followed by termination of the access.

Figure 7:
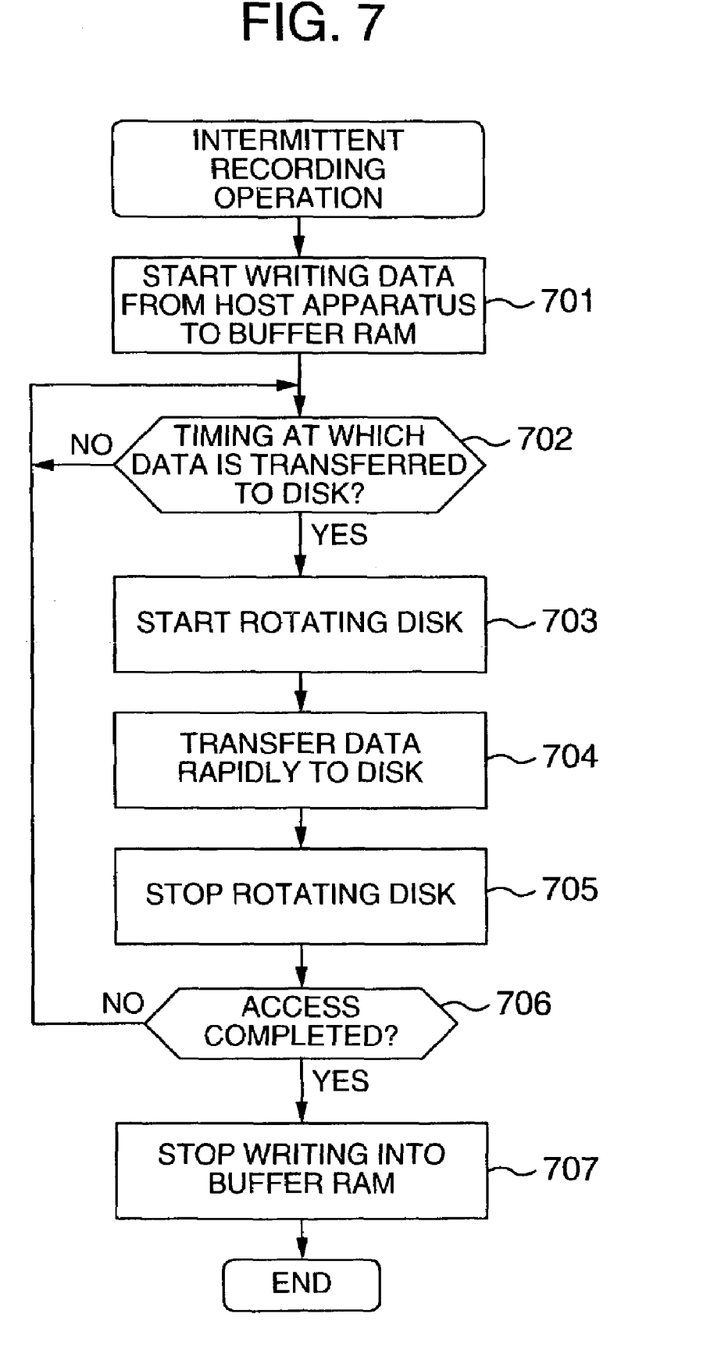
FIG. 7 is a flow chart illustrating details of an intermittent recording operation in FIG. 6.

FIG. 7 is a flow chart illustrating details of the intermittent recording operation (step 604). First, the disk CPU 21 starts writing data compressed by the host apparatus 1 into the buffer RAM (step 701). This write operation is continuously performed using the write point until the recording operation is completed since streaming data is continuously inputted.

Next, the disk CPU 21 examines for a timing at which the data is intermittently transferred to the magnetic disk (step 702). This timing should be before the buffer RAM is filled with written data, and can be readily determined from the rate of the compressed streaming data and the capacity Rb of the buffer RAM. Upon arrival of the timing at which data is intermittently transferred to the disk (Yes at step 702), the disk CPU 21 performs start-up processing which involves starting the disk, powering logical circuits, and the like (step 703). The disk CPU 21 instructs the SPM controller 28 to set the rotational speed at this time to the value found at step 602 in FIG. 6. While the magnetic disk starts rotating in this manner, the foregoing transfer timing must be determined to prevent data written in the buffer RAM from exceeding the capacity Rb before the rotation is stabilized to permit an access to the magnetic disk.

As the magnetic disk reaches a predetermined rotational speed and thus becomes stable, data written in the buffer RAM is rapidly transferred to the magnetic disk in burst using the read pointer (step 704). After this transfer ends, the disk CPU 21 stops rotating the disk, and stops powering the logical circuits and the like (step 705), and examines whether or not the recording access is completed (step 706). When the recording access is not completed, the disk CPU 21 repeats steps 702–706. When the recording access is completed, the disk CPU 21 stops writing data into the buffer RAM, followed by termination of the intermittent recording operation (step 707).

Figure 8:
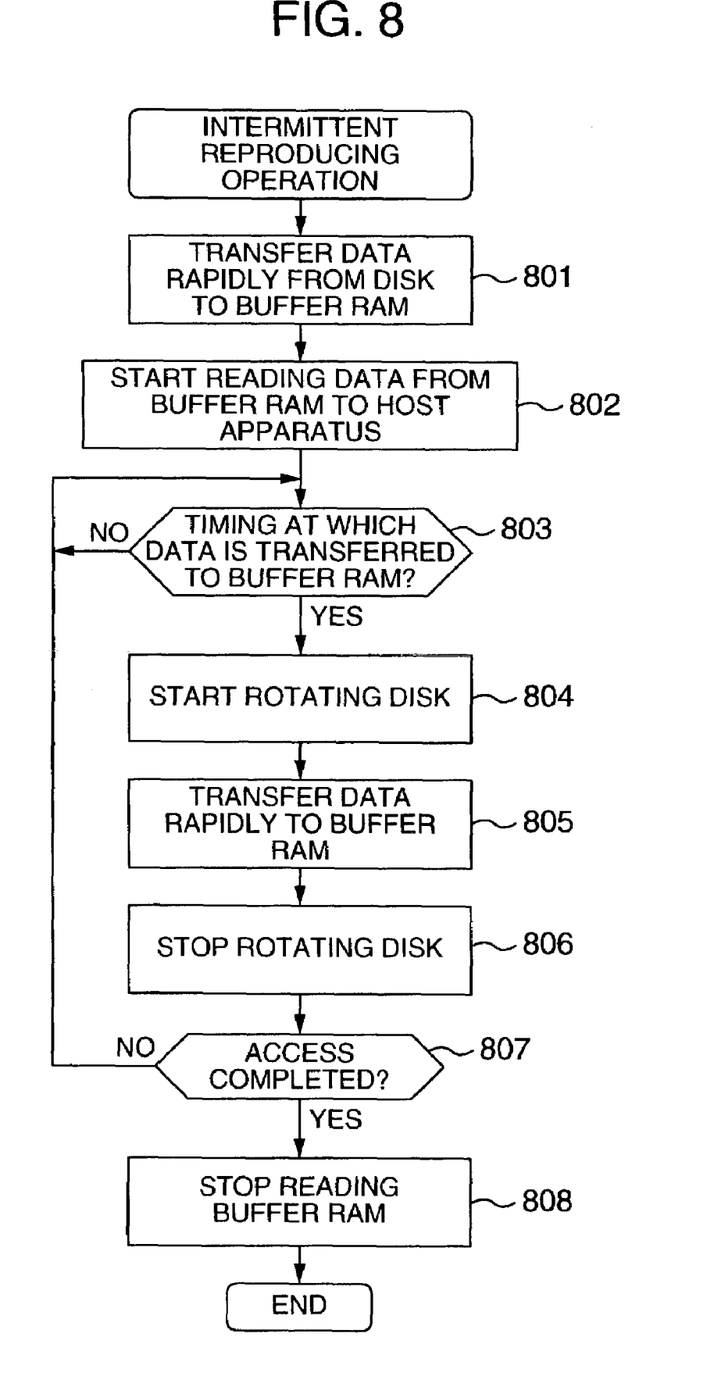
FIG. 8 is a flow chart illustrating details of an intermittent reproducing operation in FIG. 6.

FIG. 8 is a flow chart illustrating details of the intermittent reproducing operation (step 605 in FIG. 6). First, the disk CPU 21 rapidly transfers a portion of recorded data equal to the capacity of the buffer RAM in burst from the magnetic disk to the buffer RAM (step 801), and subsequently starts reading data from the buffer RAM to the host apparatus 1 (step 802). This read operation, which is as slow as a transfer of streaming data continuously outputted from the host apparatus, is continuously performed using the read pointer until the reproducing operation is completed. Next, the disk CPU 21 examines for a timing at which data is intermittently transferred from the magnetic disk to the buffer RAM (step 803). This timing should be before the buffer RAM is emptied by the read operation, and is determined by the rate of compressed streaming data and the capacity of the buffer RAM, as is the case with the recording operation. Upon arrival of the timing at which data is intermittently transferred to the buffer RAM (Yes at step 803), the disk CPU 21 performs the start-up processing which involves starting the disk, powering the logical circuits, and the like (step 804). In this event, the disk CPU 21 instructs the SPM controller 28 to set the rotational speed to the value found at step 602 in FIG. 6. While the magnetic disk is started in this manner, the foregoing transfer timing must be determined such that the buffer RAM is not emptied before the rotation is stabilized to permit an access to the magnetic disk.

As the magnetic disk reaches a predetermined rotational speed and thus becomes stable, the data recorded on the magnetic disk is rapidly transferred to the buffer RAM in burst using the write pointer (step 805). After this transfer ends, the disk CPU 21 stops rotating the disk, and stops powering the logical circuits and the like (step 806), and examines whether or not the reproducing access is completed (step 807). When the reproducing access is not completed, the disk CPU 21 repeats steps 803–807. When the reproducing access is completed, the disk CPU 21 stops reading data from the buffer RAM to the host apparatus (step 808), followed by termination of the intermittent reproducing operation.

As described above, the present invention uses the RAM in the host apparatus to implement a portion or entirety of the buffer RAM for an intermittent access, thereby achieving a reduction in size, weight and cost of the removable magnetic disk apparatus. In addition, the rotational speed of the spindle is controlled to be variable in accordance with the capacity of the buffer RAM and a particular access mode to save the power consumed by the storage system.

While the foregoing description has been made on the assumption that continuous streaming data is transferred between the storage system and the outside, it should be apparent that the present invention can be applied in a similar manner to a burst data transfer between the storage system and the outside as long as the amount of transferred information is sufficiently small as compared with the amount of information corresponding to an access speed of the magnetic disk.

As appreciated from the foregoing description, the present invention advantageously reduces the size, weight and cost of the removable magnetic disk apparatus, and saves the power consumed by the storage system.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic disk apparatus removably mounted or embedded to a host apparatus having a RAM, comprising:
   a magnetic disk; and
   a control mechanism for intermittently accessing said magnetic disk for recording or reproduction using said RAM of said host apparatus as at least a part of a buffer, said control mechanism of said magnetic disk apparatus at least enabling intermittent accessing of said RAM of said host apparatus for recording or reproduction.

2. A magnetic disk apparatus removably mounted or embedded to a host apparatus having a RAM, comprising:
   a magnetic disk; and
   a control mechanism for intermittently accessing said magnetic disk for recording or reproduction using said RAM of said host apparatus as at least a part of a buffer, said control mechanism of said magnetic disk apparatus at least enabling intermittent accessing of said RAM of said host apparatus for recording or reproduction;
   rotational speed determining means for determining a rotational speed of said magnetic disk at which total power consumption of said magnetic disk apparatus is reduced in accordance with at least one of the capacity of said buffer RAM utilized by said control mechanism and an access mode indicative of whether or not said magnetic disk is accessed for recording or reproduction;
   driving control means for controlling said magnetic disk to rotate at the rotational speed determined by said rotational speed determining means; and
   servo clock extracting means for extracting a servo clock in accordance with the rotational speed at which said magnetic disk is driven by said driving control means.

3. A storage system comprising:
   said magnetic disk apparatus according to claim 1; and
   a host apparatus including an interface for removably mounting said magnetic disk apparatus thereto.

4. A storage system comprising:
   said magnetic disk apparatus according to claim 2; and
   a host apparatus including an interface for removably mounting said magnetic disk apparatus thereto.

* * * * *